ically a formation
penetrated by a producing well which formation contain a plurality of zones, one or more of which are producing petroleum and one or more of which are producing water. The treatment selectively reduces the permeability of the water-producing intervals without adversely affecting the permeability of the oil producing intervals, thereby reducing the production of water and reducing the water-oil ratio of the fluid being produced from the well. The treatment method involves introducing an effective amount of a liquid comprising a hydrocarbon having dispersed therein an unhydrated water swellable clay such as bentonite, a sodium montmorillonite. The clay swells on contacting water in the water-producing intervals and plugs or reduces the permeability of the flow channels in the water-producing intervals.

United States Patent [19]

White et al.

[11] 4,261,422

[45] Apr. 14, 1981

[54] METHOD FOR TREATING UNDERGROUND FORMATIONS

[75] Inventors: Nikolas F. White, Houston, Tex.; John R. Noles, Madison, N.J.; Clarence O. Walker, Richmond, Tex.

[73] Assignee: Texaco Inc., White Plains, N.Y.

[21] Appl. No.: 958,597

[22] Filed: Nov. 7, 1978

[51] Int. Cl.³ .............................................. E21B 43/22
[52] U.S. Cl. .................................. 166/305 R; 166/292
[58] Field of Search ............... 166/273, 274, 292, 294, 166/305 R

[56] References Cited

U.S. PATENT DOCUMENTS

| | | | |
|---|---|---|---|
| 2,065,512 | 12/1936 | Cannon | 166/292 |
| 2,143,991 | 1/1939 | Loomis | 166/294 |
| 2,259,875 | 10/1941 | Bent et al. | 166/294 X |
| 2,342,588 | 2/1944 | Larkin | 166/294 |
| 2,427,848 | 9/1947 | Garrison | 166/294 |
| 2,614,635 | 10/1952 | Williams et al. | 166/294 X |
| 2,836,555 | 5/1958 | Armentrout | 166/292 X |
| 2,863,509 | 12/1958 | Messenger et al. | 166/292 |
| 2,959,223 | 11/1960 | Harmon et al. | 166/294 X |
| 3,078,920 | 2/1963 | Ten Brink | 166/295 |
| 3,670,820 | 6/1972 | Norton et al. | 166/305 R |

Primary Examiner—Stephen J. Novosad
Assistant Examiner—George A. Suchfield
Attorney, Agent, or Firm—Carl G. Ries; Robert A. Kulason; Jack H. Park

[57] ABSTRACT

Disclosed is a method for treating subterranean formations such as underground petroleum-containing formations penetrated by a well, and particularly a formation penetrated by a producing well which formation contain a plurality of zones, one or more of which are producing petroleum and one or more of which are producing water. The treatment selectively reduces the permeability of the water-producing intervals without adversely affecting the permeability of the oil producing intervals, thereby reducing the production of water and reducing the water-oil ratio of the fluid being produced from the well. The treatment method involves introducing an effective amount of a liquid comprising a hydrocarbon having dispersed therein an unhydrated water swellable clay such as bentonite, a sodium montmorillonite. The clay swells on contacting water in the water-producing intervals and plugs or reduces the permeability of the flow channels in the water-producing intervals.

15 Claims, No Drawings

METHOD FOR TREATING UNDERGROUND FORMATIONS

FIELD OF THE INVENTION

This invention relates to treatment of subterranean earth formations. More particularly, this invention pertains to a method for treating subterranean formations comprised of a plurality of layers, one or more of which is producing petroleum and one or more of which is producing water, so as to reduce the permeability of the water producing intervals selectively, without adversely affecting the permeability of the petroleum producing intervals.

BACKGROUND OF THE INVENTION

When petroleum is found in a subterranean reservoir or formation, current field practice comprises penetrating the formation with the well, providing a flow conduit in the well and establishing fluid communication between the inside of the flow conduit and the petroleum-containing formation by perforation or other means, in order to permit the petroleum to flow or be pumped to the surface of the earth. Many subterranean, petroleum-containing reservoirs are comprised of a plurality of strata or separate earth formations, and it is not unusual for a producing well to be in contact with one or more separate intervals from which petroleum is recovered and also with one or more intervals from which water is recovered from the reservoir. Even in the early stages of primary recovery, some water production is not uncommon due to naturally occurring earth strata which have water present in the pore spaces thereof. Many formations overlie and contact an active aquifer, and production of large volumes of water from an underlying aquifer is a common result in such instances. Even if care is taken in completing the well only in the oil-saturated portion of the reservoir the greater mobility of water frequently results in substantial water production.

Numerous techniques have been disclosed and applied in field operations, for the purpose of reducing the permeability of water-producing intervals in a selective fashion, so as to reduce the flow of water without substantially reducing the flow of the desired petroleum fluids from the reservoir. One practice employed heretofore has been to inject liquid cement into the permeable formation and then to permit the cement to set, thereby rendering the formation so treated substantially fluid impermeable. Another method practiced has been to inject two treating fluids, one followed by the other, the fluids being selected on the basis that one or more components of one fluid will react with one or more components of the other fluid, resulting in the deposition of solid materials in the flow channels of the formation so treated, thus reducing the permeability of the treated portions of the formation.

Each of the foregoing discussed methods of plugging or reducing the porosity and/or permeability of an underground formation has some disadvantages. It is difficult to inject liquid cement into relatively tight formations such as are frequently encountered in petroleum production operations. Furthermore, it is difficult to control plugging with cement, and it is frequently found that the permeability of the oil bearing zone is reduced as much as the permeability of the water bearing zone, and thus production of both water and oil is made more difficult from a well thus treated. The use of two reactive fluids to form a plug in situ in a formation has not been entirely satisfactory due to a skin plugging effect at the interface between the two solutions as well as between the fluids and the formation. It has also been found difficult to obtain adequate mixing between the two separately-injected fluids in the formation so as to achieve effective reaction of the reactive component of fluids thus injected.

Treatment of subterranean formations with aqueous fluids, usually water or brine containing viscosity-increasing hydrophilic polymers such as polyacrylamide or polysaccharide, particularly in combination with injection of slugs of compounds which cause cross-linking between the polymers contained in the previously injected fluids and encourage the adsorption or attachment of polymers to the mineral surfaces of the earth formation have been developed. These have proven somewhat effective in certain applications but also suffer from serious operating problems. The polymers are not selective with respect to oil-containing and water-containing formations, and are as likely to reduce the permeability of the strata from which petroleum production is being taken as they are to reduce the permeability of strata from which water production is being obtained. Furthermore, the commonly available hydrophilic polymers are not stable with respect to temperature, and so these materials are not at all suitable for use in formations which are being stimulated by thermal means, such as by steam injection. Since thermal stimulation techniques have become a very popular method of increasing the production of oil from subterranean formations, particularly viscous, low API gravity oil, it is particularly desireable to provide a method for treating subterranean formations so as to reduce the permeability of water saturated intervals selectively, while not affecting the permeability of petroleum containing intervals, by application of a method which is suitable for use in high temperature environments such as those encountered in steam flooding or other thermal recovery means.

It is an object of the present invention to provide a formation treating method whereby the permeability of intervals in a formation penetrated by a well which are producing water can be reduced substantially while not reducing the permeability of the oil producing intervals to the same degree. It is another object of this invention to provide a thermally stable treatment for selective permeability adjustment. At least certain portions of these objects will be achieved by at least one embodiment of the present invention.

PRIOR ART

U.S. Pat. No. 3,078,920 discloses a method of treating a subterranean formation such as that disclosed above, which method accomplishes selective reduction in the permeability of water producing intervals without causing significant reduction in permeability of oil producing intervals. The method comprises injecting into the formation a solution of a polymerized methacrylate dissolved in a non-aqueous solvent which includes glacial acidic acid, acidic anhydride and hydrous propionic acid, liquid aliphatic ketones such as acetone, methylethyl ketone, and the like.

A method is in common field use in treating a problem sometimes encountered in drilling wells referred to as lost circulation, comprising injecting a fluid comprising hydrocarbon having dispersed therein a water swellable clay.

SUMMARY OF THE INVENTION

We have discovered a method for treating subterranean earth formations penetrated by a well, said well being in fluid communication with a plurality of strata or layers of earth formation, including at least one water producing interval and at least one oil producing interval. The method accomplishes selective reduction of the permeability of the water producing interval without causing significant reduction in the permeability of the oil producing intervals. The method comprises introducing a liquid treating fluid into the well to contact the formation, the fluid comprising a liquid hydrocarbon having dispersed therein a water swellable clay such as bentonite or sodium montmorillonite. The fluid should be compounded essentially water free to avoid causing the bentonite to swell prior to introduction thereof into the formation. Moreover, the bentonite should be ground sufficiently fine that its particle size in the unhydrated state is significantly less than the average size of the flow channels of the earth formation being treated. Suitable non-aqueous liquids include hydrocarbons such as diesel oil, as well as other refined petroleum products including naphtha, kerosene, etc. High API gravity crude oil may also be utilized for this purpose, so long as its viscosity is sufficiently low to permit injection of the oil into the formation to be treated. The treating fluid is compounded by adding from 10 to 100 and preferably from 30 to 70 pounds of the water swellable clay per barrel of non-aqueous carrier liquid. The amount of fluid injected into the formation will ordinarily be from 200 to 5000 and preferably from 700 to 3000 gallons per foot of earth formation with which the well is in communication. This is ordinarily followed by injecting the same or a similar non-aqueous fluid into the formation to displace it away from the well bore, followed by a waiting period to allow the clay to absorb water from the pore spaces of the water saturated intervals in the formation, which causes the clay particles to swell and plug or reduce the permeability of the flow channels of the water producing interval. Since the oil producing interval contains little or no water in the flow channels, the clay particles do not swell even if the treating fluid invades significant volumes of such oil producing intervals, and so no permeability loss results. After the treating fluid has been injected and displaced away from the well bore by injecting a non-aqueous fluid and the fluid is allowed to remain in the formation for a period of time sufficient to effect hydration of the water-swellable clay, the well is placed back on production and petroleum production is obtained at an undiminished rate with significantly reduced production of water.

DETAILED DESCRIPTION OF THE PREFERRED EMBODIMENTS

The treating fluid used in the permeability-adjusting treatment of our invention is ordinarily a liquid comprising a hydrocarbon or other non-aqueous liquid, having dispersed therein an effective amount of water sensitive clays, which swell on contacting water.

The non-aqueous fluid should be a hydrocarbon or other non-aqueous substance which is liquid at the formation temperature and injection pressure. The viscosity of the non-aqueous liquid should be relatively low, at least less than 10 and preferably less than 6 centipoise at formation conditions. Diesel oil is a satisfactory hydrocarbon for this purpose since it is readily available and quite effective. Other refined petroleum products including kerosene, naphtha, natural gasoline, etc. may also be utilized for this purpose. High API gravity crude oil, preferably crude oil whose API gravity is greater than 30°, may also be employed.

The water swellable clay should be a clay which expands significantly in volume on contacting water. Wyoming bentonite, a sodium montmorillonite, is a particularly preferred clay for this application since it is a commonly-used drilling fluid additive and so readily available in the vicinity of oil fields and exhibits a high degree of swelling on contacting water. Other water swellable clays may be employed, such as degraded illite and degraded chlorite.

In preparing the treating fluid, the particle size of the water swellable clays is very important. It is essential that the clays be employed in a non-hydrated form, and so contact between clay and water should be avoided in the course of preparing the treating fluid. The clay should be ground to a fineness such that the average clay particle size is less than the average diameter of the pore spaces of the formation being treated. If the particle size exceeds the pore throat diameter the clay particles filter out on the surface of the well bore and in-depth reduction of permeability of the water producing intervals is not obtained. In relatively "tight" formations, e.g. low permeability formations containing small diameter flow channels, it may be necessary to grind the clay in a colloid mill or other apparatus to achieve even smaller particle sizes than is readily available in commercial Wyoming Bentonite products such as are employed as a drilling fluid additive. In high permeability formations, containing relatively large flow channels, the commercial clay product may be used without further processing. From 10 to 100 and preferably from 30 to 70 pounds of dry, unhydrated water swellable clay should be used per barrel of non-aqueous liquid.

The volume of treating fluid required to treat a well depends on the thickness of the formation to be treated, the permeability and porosity of the formation, and the distance away from the well bore which the treatment is to be made. Ordinarily, it is desired to inject a sufficient amount of treating fluid to treat a volume equivalent to a cylinder whose height is equal to about the thickness of the formation with which the well communicates, the radius being from 5 to 100 feet and preferably more than at least 20 feet, in order to ensure that the permeability reduction effect extends at least 10 to 20 feet away from the well bore rather than being confined to the portion of the formation immediately adjacent to it in contact with the well into which the treatment fluid is being injected. As a general guideline, the volume of treating fluid used in our process is from 200 to 5000 and preferably from 700 to 3000 gallons per foot of formation to be treated, with the optimum volume for any particular application being in the higher portion of this range for high porosity formations and conversely the optimum values being chosen from the lower portion of the range for low porosity formations.

In applying the process of our invention to a formation, the predetermined volume of fluid compounded in accordance with the above disclosure is injected into the production well, and passes through the perforations in the well casing out into the subterranean formation. It is preferred that the fluid be thereafter displaced further away from the well bore by injecting a non-aqueous liquid, usually the same hydrocarbon or other non-aqueous liquid as is employed as the carrier for the water-soluble clays in the treating fluid, to displace the treating fluid further into the formation away from the well bore. Ordinarily from 200 to 5000 and preferably from 700 to 3000 gallons of non-aqueous liquid per foot of formation thickness are employed in this step of the process of our invention.

After the treating fluid has been injected and displaced away from the well bore by the non-aqueous liquid as disclosed above, it is preferred to allow the materials to remain in the well bore by keeping the well shut in for a period of time sufficient to ensure that the water swellable clays have contacted water in the water producing intervals, causing the clay particles to swell and plug or reduce the permeability of flow channels in the water producing intervals. Although the swelling of clay on contacting water is quite rapid, almost instantaneous, the waiting period is necessary to ensure that water contacts the water swellable clay in the water flow channels, since the water must migrate into the treating liquid. Ordinarily from 12 to 24 hours is satisfactory for this purpose.

After the above described treatment, the well may then be placed on production and the fluid recovered from the well is thereafter comprised of significantly less water comixed with the oil or petroleum than was obtained prior to the treatment process.

The above described phenomena is quite satisfactory for use in formations producing water whose salinity is less than 30,000 and preferably less than 10,000 parts per million total dissolved solids. If the water salinity being recovered from a producing well is significantly greater than about 30,000 parts per million total dissolved solids, the reaction is not as rapid and in very high brine situations may not occur at all. In such instances, a slightly different procedure may be employed. This involves first injecting low salinity water, i.e. water having salinity less than 15,000 and preferably less than 10,000 parts per million total dissolved solids into the producing well to pass into the formation, displacing the high brine water away from the immediate vicinity of the producing well. Ordinarily from 400 to 40,000 and preferably from 1400 to 6000 gallons of low salinity water per foot of formation is adequate for this purpose. The above described process may then be applied, and greater reduction in permeability to water swelling will be achieved. Although some invasion of the low salinity water in the oil producing intervals may be accomplished, it preferentially invades the water producing intervals because of the water-character of that portion of the formation with which the producing well communicates, and so the preponderance of the permeability reduction will occur in the strata which were originally producing water rather than the strata which were originally producing oil.

FIELD EXAMPLE

The following illustration is offered for the purpose of offering a complete disclosure of the process of our invention as it would be applied in a field situation. This is not intended to be in any way limitative or restrictive of our invention, which will be defined precisely in the claims appended hereinafter below.

A producing well penetrates a subterranean petroleum formation and the well is perforated from 8520 feet to 8545 feet. The fluid being recovered from the well is approximately 95 percent water, and it is desired to treat the wells to selectively reduce the permeability of the water producing intervals and thereby reduce the water production rate without adversely affecting the petroleum production rate from the well.

A total of 17,500 gallons of diesel oil are utilized in preparing a treating fluid for treating this well. A treating fluid is formulated by adding 20,000 pounds of dry, unhydrated Wyoming Bentonite to diesel oil to form a treating slurry. The bentonite is added directly in a dry form to the diesel oil and care is taken to avoid mixing any water with the treatment fluid. The resultant fluid has a viscosity of approximately six centipoise at the surface ambient temperature of 85° F. This fluid is injected into the well and then displaced into the formation by injecting 17,500 gallons of diesel oil which contains no clay dispersed therein. The well is shut in for 24 hours to ensure that water present in the water producing intervals of the formation migrates into the treating fluid and contacts the water swellable clays. The salinity of the water that was being produced from the well prior to the treatment was 15,000 parts per million total dissolved solids, so no pretreatment with fresh water is utilized. After the prescribed waiting period, the well is put back on production, and the water content of the fluid being recovered from the well is determined to be 20 percent. The total oil production rate is unchanged. This is considered to be an excellent result.

EXPERIMENTAL RESULTS

The following laboratory tests were performed to demonstrate the operability of the present invention. A slurry was prepared by adding 50 pounds of Wyoming bentonite per barrel of diesel oil, and it was determined that the viscosity of the fluid was 6 centipoise at laboratory conditions. This fluid was brought into contact with brine whose salinity water 25,000 parts per million total dissolved solids and the viscosity of the resultant mixture was thereafter determined to be 35 centipoise. In a second test, another sample of the treating fluid was brought into contact with laboratory water having a salinity of about 15,000 parts per million total dissolved solids, and an extremely thickened slurry of several thousand centipoise resulted. These results clearly indicate the effectiveness of the treating fluid of our invention for producing a viscous fluid which will reduce the permeability of flow channels of formations containing water into which the slurry has been injected.

Thus we have disclosed and demonstrated how to prepare a low viscosity slurry which can be injected into the formation, which will thicken on contacting water and thereby reduce the permeability of water saturated portions of the formation without accomplishing significant reduction the permeability of oil saturated intervals. While our invention has been described in terms of a number of illustrative embodiments, it is clearly not so limited and many variations thereof will become apparent to persons skilled in the art of oil recovery without departing from the true spirit and scope of our invention. It is our desire that our invention be limited and restricted only by those limitations and restrictions appearing in the claims appended immediately hereinafter below.

We claim:

1. A method of treating a subterranean, petroleum-containing formation comprised of at least one water-saturated interval and at least one oil-saturated interval, said formation being penetrated by a well in fluid communication with both of said intervals, said well producing petroleum and formation water having salinity greater than 30,000 parts per million total dissolved solids, comprising:
  (a) injecting water of salinity less than about 15,000 parts per million total dissolved solids into the formation via said well and thereafter
  (b) introducing into the formation via said well, a water-free treating fluid comprising (1) a first hydrocarbon liquid of viscosity less than 10 centipoise; and (2) an effective amount of a water swellable clay, the average clay particle size being less than the average diameter of the formation pore throat, said clay being dispersed in the hydrocarbon liquid in a relatively dry, unhydrated form;
  (c) displacing said treating fluid away from the well bore by injecting a predetermined volume of a second hydrocarbon liquid;
  (d) allowing the treating fluid to remain in the formation for a time sufficient to cause hydration of said water swellable clays; and
  (e) recovering fluids from the formation via the well.

2. A method as recited in claim 1 wherein the first hydrocarbon liquid is a high API gravity crude oil.

3. A method as recited in claim 1 wherein the first hydrocarbon liquid is a refined petroleum product selected from the group consisting of diesel oil, kerosene, natural gasoline, naphtha, and mixtures thereof.

4. A method as recited in claim 4 wherein the first hydrocarbon liquid is diesel oil.

5. A method as recited in claim 1 wherein the second hydrocarbon liquid is a high API gravity crude oil or a refined product thereof.

6. A method as recited in claim 1 wherein the water swellable clay is bentonite.

7. A method as recited in claim 1 wherein the water swellable clay is a sodium montmorillonite.

8. A method as recited in claim 1 wherein the water swellable clay is a degraded illite or degraded chlorite.

9. A method as recited in claim 1 wherein the concentration of water swellable clay in the non-aqueous liquid is from 10 to 100 pounds per barrel of liquid.

10. A method as recited in claim 1 wherein the concentration of water swellable clay in the non-aqueous liquid is from 30 to 70 pounds per barrel of liquid.

11. A method as recited in claim 1 wherein the volume of treating fluid is sufficient to contact a volume of formation from 5 to 30 feet from the well being treated.

12. A method as recited in claim 1 wherein the volume of treating fluid is from 200 to 5000 gallons per foot of formation being treated.

13. A method as recited in claim 1 wherein the volume of treating fluid is from 700 to 3000 gallons per foot of formation being treated.

14. A method as recited in claim 1 wherein the volume of the second non-aqueous liquid injected in step (b) is from 200 to 5000 barrels per foot of formation.

15. A method as recited in claim 1 wherein the time which the treating fluid is allowed to remain in the formation in Step (c) is from 12 to 24 hours.

* * * * *